(12) United States Patent
Jang et al.

(10) Patent No.: US 11,178,372 B1
(45) Date of Patent: Nov. 16, 2021

(54) IMAGE SIGNAL PROCESSOR, IMAGE SIGNAL PROCESSING METHOD AND ELECTRONIC DEVICE THEREOF

(71) Applicant: Samsung Electronics Co., Ltd., Suwon-si (KR)

(72) Inventors: Chan Young Jang, Pohang-si (KR); Hee Kang, Hwaseong-si (KR); Woo Seok Choi, Suwon-si (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 17/173,434

(22) Filed: Feb. 11, 2021

(30) Foreign Application Priority Data

May 29, 2020 (KR) ........................ 10-2020-0065305

(51) Int. Cl.
| | |
|---|---|
| *H04N 9/73* | (2006.01) |
| *H04N 9/64* | (2006.01) |
| *H04N 9/77* | (2006.01) |
| *G06T 3/40* | (2006.01) |
| *H04N 9/04* | (2006.01) |
| *H04N 5/247* | (2006.01) |
| *H04N 5/232* | (2006.01) |

(52) U.S. Cl.
CPC .............. *H04N 9/735* (2013.01); *G06T 3/40* (2013.01); *G06T 3/4023* (2013.01); *H04N 5/23229* (2013.01); *H04N 5/23235* (2013.01); *H04N 5/247* (2013.01); *H04N 9/045* (2013.01); *H04N 9/646* (2013.01); *H04N 9/73* (2013.01); *H04N 9/77* (2013.01)

(58) Field of Classification Search
CPC .......... H04N 9/735; H04N 9/77; H04N 9/045; H04N 9/646; H04N 9/73; H04N 5/247; H04N 5/23229; H04N 5/347; H04N 5/23235; G06T 3/40; G06T 3/4023
See application file for complete search history.

(56) References Cited

U.S. PATENT DOCUMENTS

| | | | |
|---|---|---|---|
| 7,369,165 | B2 | 5/2008 | Bosco et al. |
| 7,616,241 | B2 | 11/2009 | Nam |
| 7,769,230 | B2 | 8/2010 | Pillman et al. |
| 7,826,658 | B2 | 11/2010 | Sato et al. |
| 7,929,807 | B2 | 4/2011 | Andersen |
| 8,605,837 | B2 | 12/2013 | Wiese et al. |
| 8,780,238 | B2 | 7/2014 | Bowers |

(Continued)

*Primary Examiner* — Nelson D. Hernández Hernández
(74) *Attorney, Agent, or Firm* — Myers Bigel, P.A.

(57) ABSTRACT

An image signal processor is provided. The image signal processor includes a white balancing block which performs white balancing on a raw RGB image of a Bayer pattern received from an image sensor on a kernel basis or in a kernel unit, a green generation block which performs cross-binning on white-balanced G pixel to generate a first green pixel, and adds a high-frequency component to which a preset weight is applied to generate a binned green pixel, a red-blue generation block which generates a U pixel and a V pixel indicating directionality, on the basis of the binned green pixel, a white-balanced R pixel, and a white-balanced B pixel, and merges the binned green pixel to each of the U pixel and the V pixel to generate a binned red pixel and a binned blue pixel and an inverse white balancing block which performs an inverse white balancing on the binned red pixel, the binned green pixel, and the binned blue pixel to output a final binning image.

20 Claims, 10 Drawing Sheets

(56) References Cited

U.S. PATENT DOCUMENTS

| | | |
|---|---|---|
| 9,576,369 B2 | 2/2017 | Venkataraman et al. |
| 2008/0260291 A1 | 10/2008 | Alakarhu et al. |
| 2012/0194720 A1* | 8/2012 | Bowers .............. H04N 9/04511 348/302 |
| 2013/0236095 A1 | 9/2013 | Hitomi et al. |
| 2021/0014530 A1* | 1/2021 | Ando ................... H04N 19/182 |

* cited by examiner

IMAGE SIGNAL PROCESSOR, IMAGE SIGNAL PROCESSING METHOD AND ELECTRONIC DEVICE THEREOF

CROSS-REFERENCE TO RELATED APPLICATION

This application claims benefit of priority to Korean Patent Application No. 10-2020-0065305 filed on May 29, 2020, in the Korean Intellectual Property Office, the disclosure of which is incorporated herein by reference in its entirety.

FIELD

The present invention relates to an image signal processor, and more particularly, to an image signal processor that executes a binning operation, an image signal processing method, and an image sensing device thereof.

BACKGROUND

An image sensing device may be used in mobile devices such as a smartphone, a tablet, and a digital camera, or various electronic devices. The image sensing device is typically configured in a form in which fine pixels are two-dimensionally integrated, converts an electric signal corresponding to luminance of incident light into a digital signal, and outputs the digital signal. For example, the image sensing device may be configured in a Bayer pattern, and may provide Bayer image data corresponding to luminance of light incident on the Bayer pattern.

On the other hand, with the development of technology, the number of pixels in the image sensing device (that is, the resolution) may increase, but increasing resolution of the pixels may increase an amount of data to be processed. Accordingly, the image sensing device may perform binning. A binning operation may include operations which do not produce an image using information of all the pixels of the image sensing device, but collect the information of adjacent pixels to produce a single type of information and then produce a target image to be processed using the collected information.

SUMMARY

Aspects of the present invention provide an image signal processor in which a zigzag type noise is reduced and a false color defect is relieved to output a binned image with improved image quality.

Aspects of the present invention also provide an electronic device in which a zigzag type noise is reduced and a false color defect is relieved to output a binned image with improved image quality.

Aspects of the present invention also provide an image signal processing method in which a zigzag type noise is reduced and a false color defect is relieved to output a binned image with improved image quality.

One aspect of the present invention provides an image signal processor including a white balancing circuit configured to perform white balancing on a raw RGB image of a Bayer pattern received from an image sensor to generate a white-balanced G pixel, a white-balanced R pixel, and a white-balanced B pixel, a green generation circuit configured to perform cross-binning on the white-balanced G pixel to generate a first green pixel, and to add a high-frequency component to which a preset weight is applied to the first green pixel to generate a binned green pixel, a red-blue generation circuit configured to generate a U pixel and a V pixel indicating directionality based on the binned green pixel, the white-balanced R pixel, and the white-balanced B pixel, and to merge the binned green pixel with each of the U pixel and the V pixel to generate a binned red pixel and a binned blue pixel, and an inverse white balancing circuit configured to perform an inverse white balancing on the binned red pixel, the binned green pixel, and the binned blue pixel to output a final binning image.

One aspect of the present invention provides an electronic device including an image sensor configured to detect light reflected from a subject and to output a raw RGB image of a Bayer pattern, and an image signal processor configured to perform binning from the raw RGB image to generate a binned image, wherein the image signal processor is configured to perform operations comprising: performing white balancing on the raw RGB image to generate a white-balanced G pixel, a white-balanced R pixel, and a white-balanced B pixel; performing a green pre-processing operation on the white-balanced G pixel, and adding a high-frequency component to generate at least one binned green pixel; generating U and V pixels indicating directionality based on the binned green pixel, the white-balanced R pixel, and the white-balanced B pixel; merging the binned green pixel with each of the U pixel and the V pixel to generate a binned red pixel and a binned blue pixel; and performing an inverse white balancing on the binned red pixel, the binned green pixel, and the binned blue pixel to output the binned image.

One aspect of the present invention provides an image signal processing method, which includes receiving a raw RGB image of a Bayer pattern, performing white balancing on a kernel basis to generate a white balanced G pixel, a white-balanced R pixel, and a white-balanced B pixel, performing cross-binning on the white-balanced G pixel to generate a first green pixel, adding a high-frequency component to the first green pixel to generate at least one binned green pixel, generating a U pixel and a V pixel indicating a vertical cost and a horizontal cost based on the binned green pixel, the white-balanced R pixel, and the white-balanced B pixel, merging the binned green pixel with each of the U pixel and the V pixel to generate a binned image of a Bayer pattern including a binned red pixel and a binned blue pixel, and performing inverse white balancing on the binned image to output a final binning image.

However, aspects of the present invention are not restricted to the one set forth herein. The above and other aspects of the present invention will become more apparent to one of ordinary skill in the art to which the present invention pertains by referencing the detailed description of the present invention given below.

BRIEF DESCRIPTION OF THE DRAWINGS

The above and other aspects, features, and advantages of the present disclosure will be more clearly understood from the following detailed description taken in conjunction with the accompanying drawings, in which.

DETAILED DESCRIPTION OF THE EMBODIMENTS

Figure 1:
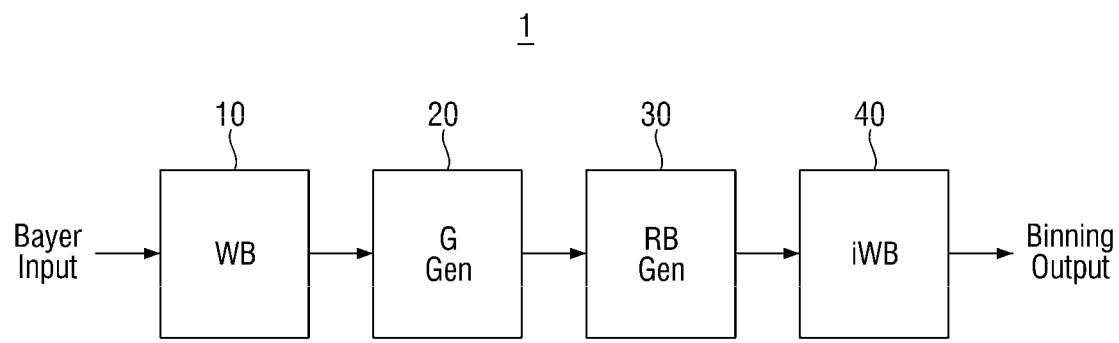
FIG. 1 is a block diagram for explaining an image signal processor according to some embodiments of the present invention.

Hereinafter, various embodiments of the present invention will be described with reference to the accompanying drawings.

Terms such as "unit" and "module" and "block" used in the detailed description, or functional blocks shown in the drawings, may be implemented in the form of hardware including electronic circuits configured to perform a particular function, software, or combinations thereof. The terms "first," "second," "third," etc. may be used herein to distinguish one element from another.

As used herein, a pixel or a pixel value may refer to information or a value that is output or acquired from an optical signal generated by physical pixel elements (e.g., of an optical sensor) that define a Bayer color filter. Hereinafter, a raw image may refer to an image according to a unit raw pixel for which image signal processing is to be performed. Hereinafter, a binning or binned image may refer to an image generated by performing the image signal processing on the raw image.

Figure 4:
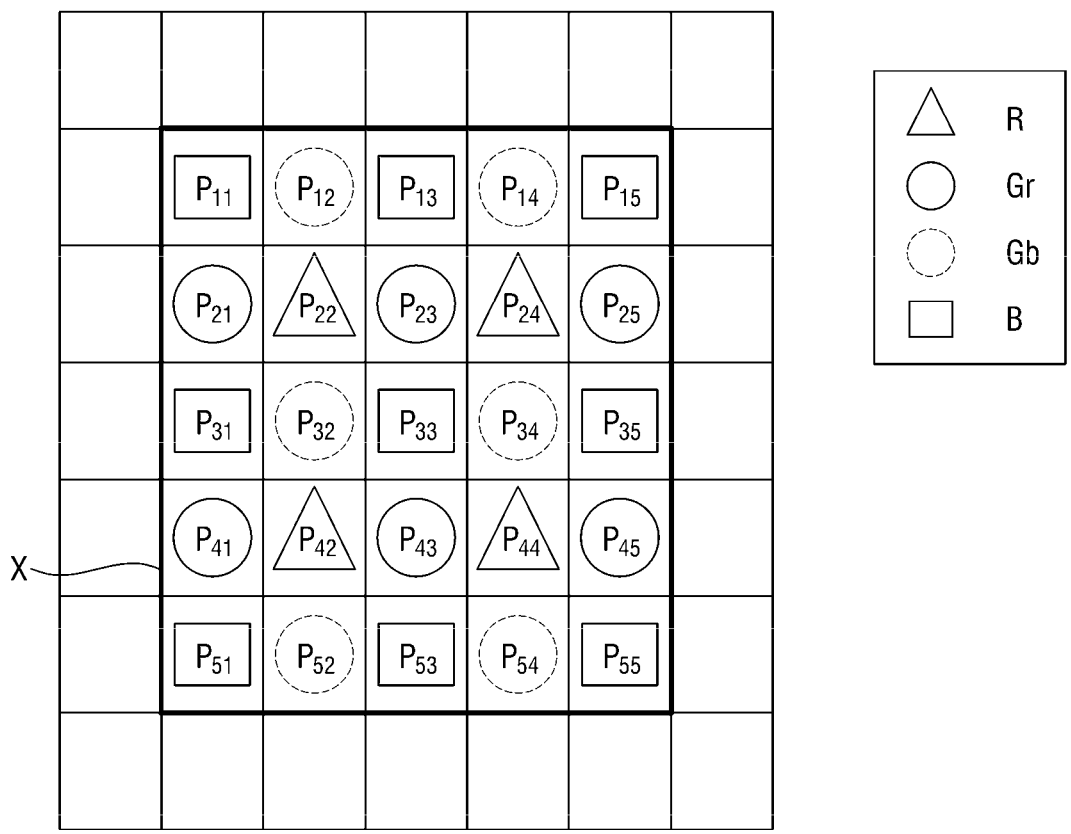
FIGS. 4, 5, 6, 7, 8, and 9 are diagrams for explaining the operation of the image signal processor according to some embodiments of the present invention.

The raw image has a Bayer pattern in which (i) rows in which Gr pixels and R pixels are sequentially placed, and (ii) rows in which Gb pixels and B pixels are sequentially placed, are alternately placed (see FIG. 4). In the present specification, although R refers to a red pixel, B refers to a blue pixel, and Gr and Gb pixels refers to green pixels, a green pixel belonging to or positioned in a row having a red pixel is expressed as Gr, and a green pixel belonging to or positioned in a row having a blue pixel is expressed as Gb.

The binning image is a downscaled image, and each of the binned pixels is expressed as an R' pixel, a G' pixel, and a B' pixel. The binning image also has a Bayer pattern in which rows in which the G' pixels and R' pixels are sequentially placed, and rows in which the G' pixels and B' pixels are sequentially placed are alternately placed.

Figure 2:
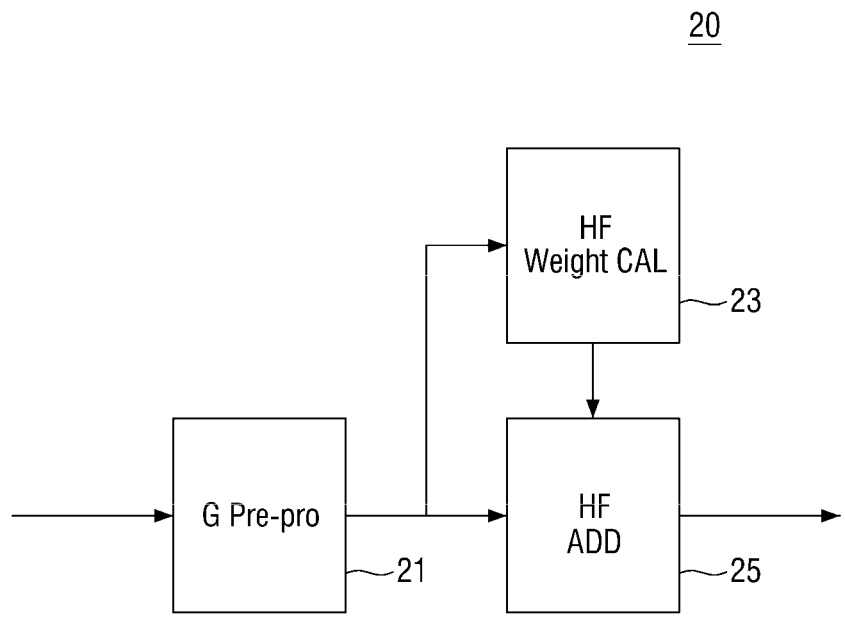
FIG. 2 is a block diagram for explaining a green generation block shown in FIG. 1.
Figure 3:
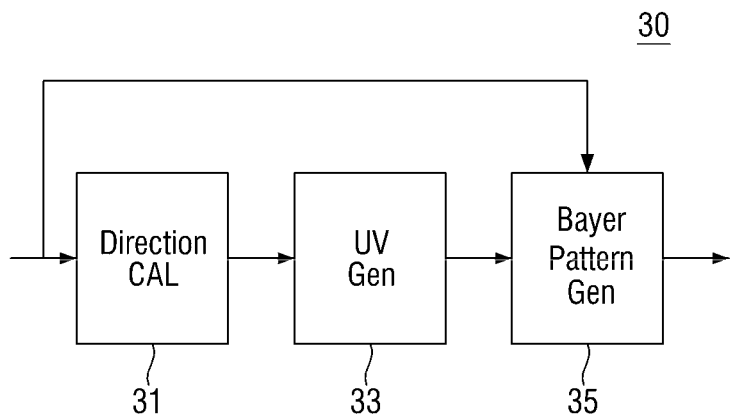
FIG. 3 is a block diagram for explaining a red-blue generation block shown in FIG. 1.

FIG. 1 is a block diagram for explaining an image signal processor according to some embodiments of the present invention. FIG. 2 is a block diagram for explaining a green generation block shown in FIG. 1. FIG. 3 is a block diagram for explaining a red-blue generation block shown in FIG. 1. FIGS. 4 to 9 are diagrams for explaining the operation of the image signal processor according to some embodiments of the present invention.

Referring to FIG. 1, an image signal processor 1 may receive a Bayer pattern image to perform a binning operation and output a binning image. That is, the image signal processor 1 may perform the image signal processing on the raw image to generate a binning image. According to some embodiments, the image signal processor 1 may include a white balancing block 10, a green generation block 20, a red-blue generation block 30 and an inverse white balancing block 40.

The image signal processor 1 may perform the image signal processing on a kernel basis. For example, in the embodiment of FIGS. 4 to 9, a kernel size in the pixel array may be 5×5. It is assumed that pixels of $P_{11}$ to $P_{55}$ are included in the kernel X in FIGS. 4 to 9. However, for convenience of explanation, although FIGS. 4 to 9 show and explain only one kernel X, the present invention is not limited thereto, and it may be applied to all pixels included in the raw image.

The white balancing block 10 performs white balancing for each raw pixel. The white balancing is an operation of subtracting a component corresponding to the characteristic of the light source from a sensed raw image to make the color of a subject itself clearer. For example, if a first blue light with a high color temperature is flashed on the subject, the raw image has a bluer color than the subject's color, but the actual color of the subject may be a color excluding blue. Therefore, the white balancing block 10 may adjust a difference in sensitivity for each color according to the characteristics of the light source.

The green generation block 20 may generate downscaled green pixels from the white-balanced raw image. Referring to FIG. 2 together, the green generation block 20 may include a green pre-processing block 21, a HF weight calculation block 23 and an HF adder HF block 25 according to some embodiments.

Referring to FIG. 4, G pixels are alternately placed with R pixels or G pixels in the kernel X, and G pixels of any one row and G pixels of the next row are also placed alternately.

The green pre-processing block 21 may generate a first green pixel value from the white-balanced green pixel values which are vertically and horizontally placed around a position at which the binning green pixel value is generated (hereinafter referred to as a target position), that is, placed adjacent to each other above and below the target position and on left and right sides of the target position, respectively. In this specification, although the operation of pre-processing the white-balanced green pixel values placed adjacent to each other above and below the target position and on left and right sides of the target position will be explained as diamond binning, cross-binning or Pan binning according to some embodiments, the green pre-processing operation is not limited to these terms and may be referred to as or by other terms.

Since the number of green pixels in the kernel X is larger than the number of pixels of each of other colors, it may more greatly influence the resolution of the image than that of other colors depending on the image signal processing type. Therefore, the green pre-processing block 21 performs vertical and horizontal binning on four green pixels adjacent to the target position, so that the binned green pixels G' are placed at the same interval while not overlapping each other, e.g., such that the binned green pixels G' are not calculated based on target positions of other binned green pixels G'. Basic pixels that perform cross-binning according to some embodiments may be diagonally equidistantly spaced from each other.

Figure 5:
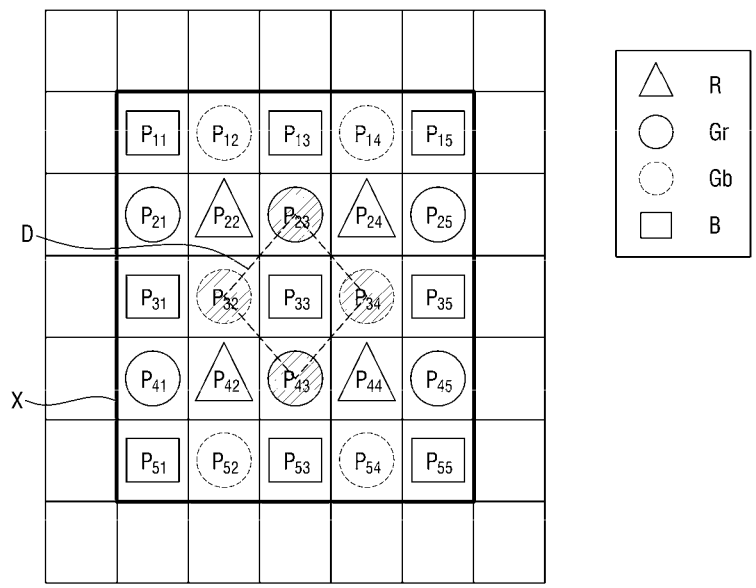

For example, the first green pixel may be generated at a position of P33 on the basis of the green pixels placed at $P_{23}$, $P_{32}$, $P_{34}$, and $P_{43}$ according to Formula 1 in FIG. 5.

$$G1\_P_{33}=(Gr\_P_{23}+Gb\_P_{32}+Gb\_P_{34}+Gr\_P_{43})/4 \qquad \text{<Formula 1>}$$

In the Formula 1, $G1\_P_{33}$ refers to a binned first green pixel value generated at the position of $P_{33}$, and $Gr\_P_{23}$, Gb_$P_{32}$, Gb_$P_{34}$, Gr_$P_{43}$ refer to white-balanced green pixel values that are placed at up, left, right, and down positions $P_{23}$, $P_{32}$, $P_{34}$, and $P_{43}$ on the basis of the target position $P_{33}$, respectively.

Figure 6:
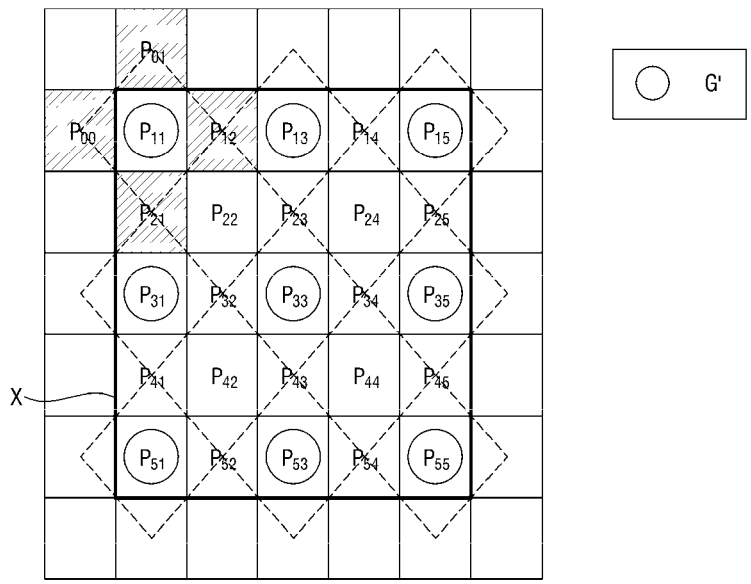

Similarly, in FIG. 6, the green pre-processing block 21 may perform binning on the basis of the green pixel values placed at $P_{00}$, $P_{01}$, $P_{12}$, and $P_{21}$ to generate G1_$P_{11}$. In addition, the green pre-processing block 21 may generate other binned first green pixel values G1_$P_{13}$, G1_$P_{15}$, G1_$P_{31}$, G1_$P_{35}$, G1_$P_{51}$, G1_$P_{53}$, and G1_$P_{55}$ from the adjacent upper, lower, left and right white-balanced green pixels (positions of the vertices indicated by the dotted lines) according to Formula 1.

The HF weight calculation block 23 calculates a weight W on the reflection degree of the high-frequency components of the Gr and Gb pixels on the basis of the R and B pixels in the kernel X. The HF adder block 25 adds the high-frequency component values of the green pixel reflecting the weight to the first green pixel value G1 to generate a binned green pixel G'. The values used in the HF adder block 25 are the values white-balanced in the green pre-processing block 21. The high-frequency component may be a value obtained by subtracting an average B (or R) pixel value from a raw B (or R) pixel value of a kernel center position Pcenter.

Specifically, the binned green pixel value G' may be generated according to Formula 2.

$$G' = G1\_P_{target} + (B_{Raw} - B_{Aver}) \times W \qquad \text{<Formula 2>}$$

In Formula 2, G' means a binned green pixel value, G1 means a cross-binned first green pixel, $B_{Raw}$ means a row B pixel value of the kernel center position, $B_{Aver}$ means an average value of the row B pixel included in the kernel, and W means a weight of the reflection degree of high-frequency component. According to some embodiments, W may be set as a user parameter according to the system, and may be a value modified by reflecting the operation of the image signal processor according to some embodiments. $B_{Aver}$ is an average value of B pixels included in the kernel X. $B_{Aver}$ may be calculated as Formula 3.

$$B_{Aver} = \frac{\Sigma B\_P_{ij}}{\text{Number of } B \text{ pixels in Kernel}} \qquad \text{<Formula 3>}$$

In Formula 3, B_$P_{ij}$ is a B pixel located at $P_{ij}$ coordinates belonging to the kernel, and $\Sigma$B_$P_{ij}$ is the total of the B pixel values in the kernel.

Figure 7:
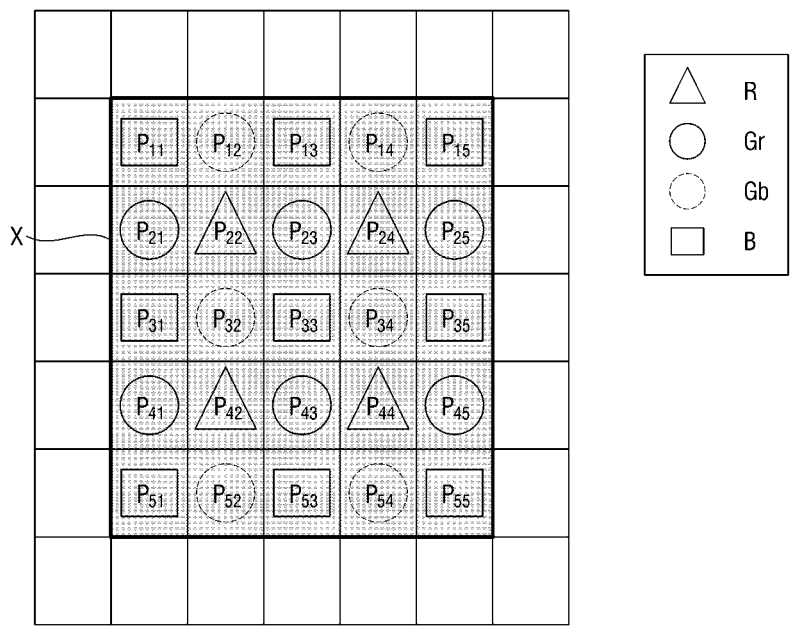

In the embodiment of FIG. 7, although nine row B pixels are shown on the basis of the center position $P_{33}$ of the kernel X, when the position of the kernel changes according to another embodiment, the raw pixel becoming the base of the high-frequency component calculation may change. In the shown embodiment, although a row B pixel in a 5×5 kernel based on the center position $P_{33}$ at which the binned green pixel G' is generated is shown, a row R pixel may also be used according to the center position.

The red-blue generation block 30 generates binned red pixels R' and binned blue pixels B' on the basis of R and B pixels. Since the red, blue, and green colors have independent wavelength bands and also include high-frequency components, a case of generating binned red pixels R' and blue pixels B' on the basis of the color channel difference (that is, U pixel and V pixel which are the difference value between color channels) in which high-frequency components are excluded may be stronger on noise than a case of applying common image signal processing to the raw pixel itself.

The red-blue generation block 30 according to some embodiments may include a direction calculation block 31, a UV generation block 33, and a Bayer pattern generation block 35 as shown in FIG. 3.

The direction calculation block 31 calculates a horizontal cost and a vertical cost in the kernel X.

According to some embodiments, a horizontal cost Hcost is a reciprocal value obtained by summing up luminance differences between horizontally adjacent same color pixels in the kernel, and the vertical cost Vcost may be a reciprocal value obtained by summing up luminance differences between vertically adjacent same color pixels in the kernel. Specifically, the vertical cost Vcost and the horizontal cost Hcost may be calculated as in Formula 4. In this case, the vertical cost Vcost and the horizontal cost Hcost may be inversely proportional to each other.

$$Hcost = \frac{1}{\Sigma(R_H\ Diff.) + \Sigma(B_H\ Diff.) + \Sigma(Gr_H\ Diff.) + \Sigma(Gb_H\ Diff.)} \qquad \text{<Formula 4>}$$

$$Vcost = \frac{1}{\Sigma(R_V\ Diff.) + \Sigma(B_V\ Diff.) + \Sigma(Gr_V\ Diff.) + \Sigma(Gb_V\ Diff.)}$$

In Formula 4, Hcost is a horizontal cost, $\Sigma(R_H\ Diff)$ is a value obtained by summing up differences between horizontally adjacent R pixels, $\Sigma(B_H\ Diff)$ is a value obtained by summing up differences between horizontally adjacent B pixels, $\Sigma(Gr_H\ Diff)$ is a value obtained by summing up differences between horizontally adjacent Gr pixels, and $\Sigma(Gb_H\ Diff)$ is a value obtained by summing up differences between horizontally adjacent Gb pixels. Vcost is a vertical cost, $\Sigma(R_V\ Diff)$ is a value obtained by summing up the differences between vertically adjacent R pixels, $\Sigma(B_V\ Diff)$ is a value obtained by summing up the differences between vertically adjacent B pixels, $\Sigma(Gr_V\ Diff)$ is a value obtained by summing up the differences between vertically adjacent Gr pixels, and $\Sigma(Gb_V\ Diff)$ is a value obtained by summing up the differences between vertically adjacent Gb pixels.

More specifically, referring to FIG. 7, the direction calculation block 31 calculates the value obtained by summing up all the differences between B_$P_{11}$ and B_$P_{13}$ included in the kernel X (hereinafter, the difference is expressed as B_$P_{11}$:B_$P_{13}$), and differences between B_$P_{13}$:B_$P_{15}$, B_$P_{31}$:B_$P_{33}$, B_$P_{33}$:B_$P_{35}$, B_$P_{51}$:B_$P_{53}$, and B_$P_{53}$:B_$P_{55}$ for $\Sigma(B_H\ Diff)$. Similarly, the direction calculation block 31 may also calculate $\Sigma(R_H\ Diff)$, $\Sigma(Gr_H\ Diff)$, and $\Sigma(Gb_H\ Diff)$ for Gr, Gb, and R color channels, and may calculate the horizontal cost Hcost as the reciprocal of the value obtained by summing up $\Sigma(B_H\ Diff)$, $\Sigma(R_H\ Diff)$, $\Sigma(Gr_H\ Diff)$, and $\Sigma(Gb_H\ Diff)$.

If the luminance difference between adjacent G pixels, adjacent R pixels, or adjacent B pixels placed at the same row in the kernel X is large, the horizontal cost Hcost may increase. That is, when having the pixel values with a large difference in the vertical direction, it may be determined that directionality of the pixel values has a smaller difference in luminance value in the horizontal direction, and the vertical cost increases.

The UV generation block 33 generates UV pixels that are color difference signals on the basis of the vertical cost Vcost and the horizontal cost Hcost. In FIG. 7, since the R pixel in the kernel X is placed on the same horizontal line as the Gr pixel and placed on the same vertical line as the Gb pixel, the UV generation block 33 reflects the direction cost of the direction, depending on the vertical color difference or the horizontal color difference, when calculating the color difference.

Specifically, the UV generation block 33 may reflect each direction cost on the horizontal color difference between R-Gr and the vertical color difference between R-Gb to generate the V value as shown in Formula 5.

The V pixel may be a value obtained by adding a color difference value between the average R pixel value and the average Gr pixel value reflecting the horizontal cost, and a color difference value between the average R pixel value and the average Gb pixel value reflecting the vertical cost. According to some embodiments, as shown in Formula 5, V may be calculated by subtracting the average value $Gr_{Aver}$ of Gr pixels placed on the same horizontal lines (e.g., the same rows) as the R pixels from the average value $R_{Aver}$ of all the R pixels included in the kernel X, then multiplying by the horizontal cost Hcost, subtracting the average value $Gb_{Aver}$ of Gb pixels placed on the same vertical lines (e.g., the same columns) as the R pixel from the average value $R_{Aver}$ of all the R pixels included in the kernel X, and then multiplying by the vertical cost Vcost and adding. At this time, the kernel X has the coordinates at which V pixels are generated as the center position. Since FIG. 7 shows $P_{33}$ as the center position, Formula 5 for generating V pixels may be applied to, for example, a kernel having $V\_P_{13}$ as the center position.

$$V=(R_{Aver}-Gr_{Aver})\times H\text{cost}+(R_{Aver}-Gb_{Aver})\times V\text{cost} \quad \text{<Formula 5>}$$

$$R_{Aver} = \frac{\sum R\_P_{ij}}{\text{Number of } R \text{ pixels in Kernel}} \quad \text{< Formula 6 >}$$

$$Gr_{Aver} = \frac{\Sigma Gr\_P_{ij}}{\text{Number of } Gr \text{ pixels in Kernel}} \quad \text{< Formula 7 >}$$

$$Gb_{Aver} = \frac{\Sigma Gb\_P_{ij}}{\text{Number of } Gb \text{ pixels in Kernel}} \quad \text{< Formula 8 >}$$

In Formulas 6 to 8, $R\_P_{ij}$ is the R pixel located at the $P_{ij}$ coordinates belonging to the kernel, $\Sigma R\_P_{11}$ is the sum of the R pixel values in the kernel, $Gr\_P_{ij}$ is the Gr pixel located at the $P_{ij}$ coordinates belonging to the kernel, $\Sigma Gr\_P_{ij}$ is the sum of the Gr pixel values in the kernel, $Gb\_P_{ij}$ is the Gb pixel located at the $P_{ij}$ coordinates belonging to the kernel, and $\Sigma Gb\_P_{ij}$ is the sum of the Gb pixels in the kernel. At this time, i and j are integers and are indices representing the coordinates in the kernel (e.g., along the rows and columns of the kernel, respectively).

Referring to the Formula 9, U pixel may be calculated by subtracting the average value $Gb_{Aver}$ of Gb pixels placed on the same horizontal lines (e.g., the same rows) as the B pixels from the average value $B_{Aver}$ of all the B pixels included in the kernel X, then multiplying by the horizontal cost Hcost, subtracting the average value $Gr_{Aver}$ of Gr pixels placed on the same vertical lines (e.g., the same columns) as the B pixels from the average value $B_{Aver}$ of all the B pixels included in the kernel X, and then multiplying by the vertical cost Vcost and adding.

$$U=(B_{Aver}-Gb_{Aver})\times H\text{cost}+(B_{Aver}-Gr_{Aver})\times V\text{cost} \quad \text{<Formula 9>}$$

In Formula 9, the average value $B_{Aver}$ of B pixels may be the average value of all B pixels included in the kernel X, as in Formula 10.

$$B_{Aver} = \frac{\Sigma B\_P_{ij}}{\text{Number of } B \text{ pixels}} \quad \text{< Formula 10 >}$$

Figure 8:
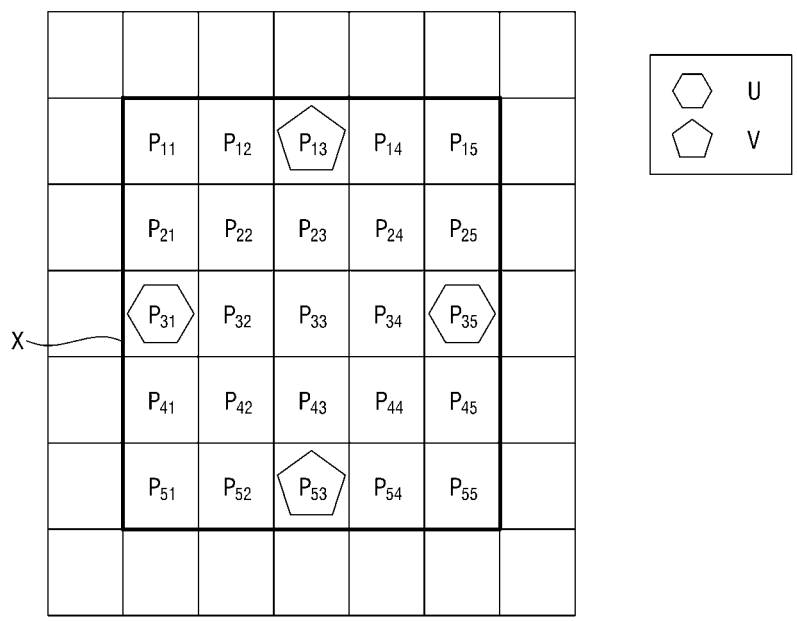

The generated U pixels and V pixels are placed at positions $P_{13}$, $P_{53}$, $P_{31}$, and $P_{35}$ as shown in FIG. 8.

Figure 9:
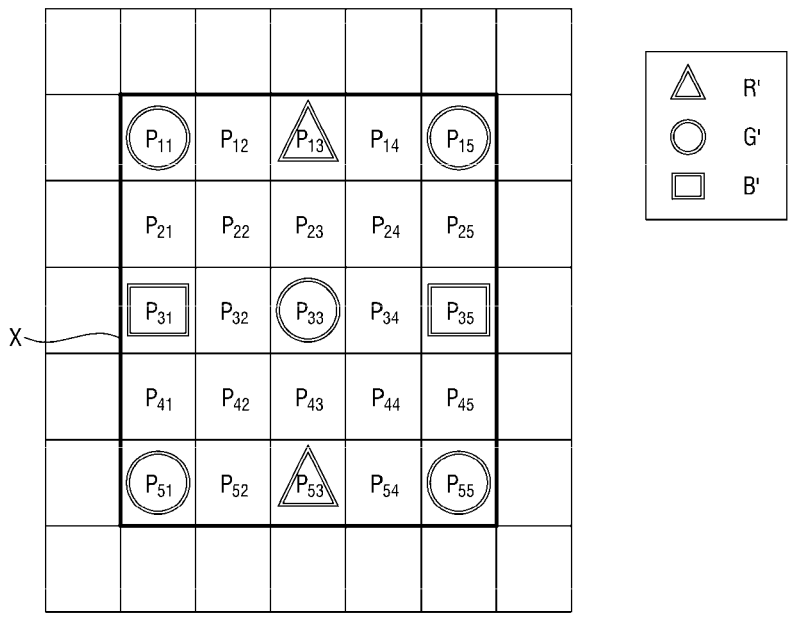

The Bayer pattern generation block 35 may be generated as a binned Bayer pattern image, by merging G' pixels generated in the green generation block 20 with U and V pixels generated in the UV generation block 33. Referring to FIGS. 6, 8 and 9, the pattern generation block 35 adds the UV image (FIG. 8) to the G' image (FIG. 6) to generate R'G'B' image (FIG. 9).

That is, the Bayer pattern generation block 35 adds the binned green pixel G' to U pixel and V pixel generated by the color difference information between R-G and B-G to generate binned red pixel R' and binned blue pixel B'. At this time, the binned R' pixel, G' pixel, and B' pixel may be placed in a Bayer pattern at downscaled intervals of the raw image. The interval between R' pixels, G' pixels and B' pixels may vary depending on a downscaling ratio. An embodiment of another downscaling will be described below in FIG. 10.

Since the white balancing block performs white balancing to perform binning of the raw image (10 of FIG. 2), an inverse white balancing is performed (40 of FIG. 2) on the image including the R' pixels, G' pixels and B' pixels that are output from the Bayer pattern generation block 35. That is, the optical characteristics of each color channel are reflected again, and a final binning image is output.

In this way, when converting a raw image into a binning image, binning is performed to have uniform sampling points centered on the green color, and the binning image is generated using the UV pixel value by reflecting or indicating the directionality, while reducing the occurrence of false color. Thus, it is possible to perform the image signal processing without substantial loss of image detail. That is, even with an image sensor having a high resolution, it is possible to acquire a high-resolution image, while reliving the occurrence of Jagging artifacts and false colors according to the image signal processing.

FIGS. 10 to 14 are diagrams for explaining the operation of the image signal processor according to some embodiments of the present invention.

FIGS. 4 to 9 are examples in which the raw image is downscaled at a rate of 1/4, and FIGS. 10 to 14 are examples in which the raw image is downscaled at a rate of 1/16. For convenience of explanation, differences from FIGS. 4 to 9 will be mainly explained, and the remaining configurations may be processed in the same or similar manner as the embodiments of FIGS. 4 to 9.

For convenience of explanation, although FIGS. 10 to 14 show an 8×7 pixel array and are explained as a 5×5 kernel X, the embodiment of the present invention is not limited thereto, and the kernel size may be enlarged or this may also be applied to adjacent pixel arrays.

Figure 10:
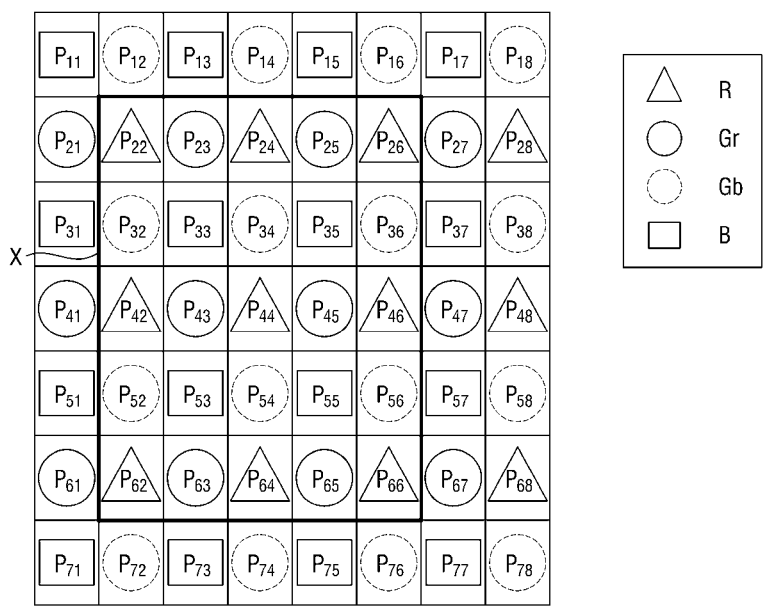
FIGS. 10, 11, 12, 13, and 14 are diagrams for explaining the operation of the image signal processor according to some embodiments of the present invention.

Referring to FIG. 10, according to some embodiments, the image signal processor 1 receives an input signal, that is, a raw image of a Bayer pattern, and may perform white balancing on the raw pixel array of the Bayer pattern.

Figures 11, 12:
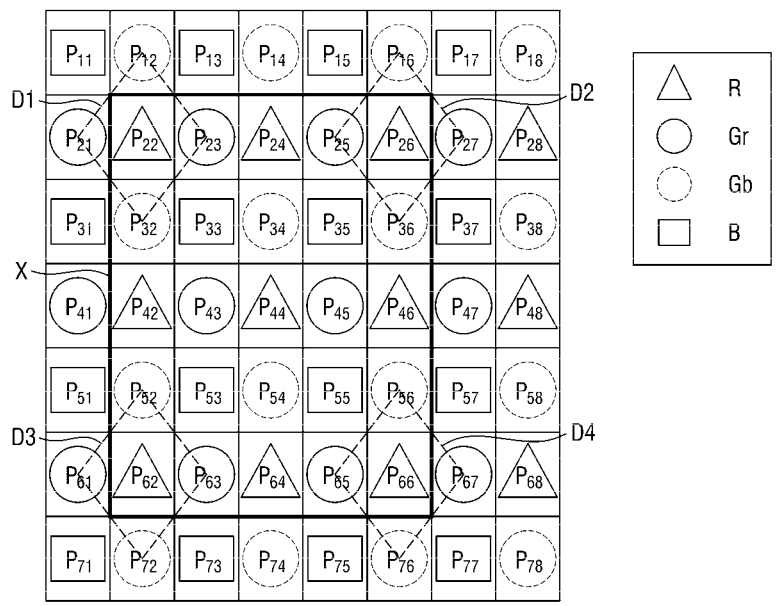

Referring to FIG. 11, the image signal processor 1 performs a green pre-processing operation so that the sampling points (pixel positions) become uniform on the basis of or relative to the center position P44 of the kernel X. That is, the green pre-processing operation may be performed to have uniform sampling points so that there is no overlap between the first green pixels after the pre-processing operation. The green pixels which are input for the green pre-processing operation may be four white-balanced green pixels that are disposed above, below, left and right sides of the target position at which the first green pixel is located. Although the green pre-processing operation may also be referred to as or by other names, such as diamond binning, cross-binning, or fan binning, according to some embodiments, it is not be limited by terminology.

According to the shown embodiment, if the cross-binning of G pixels is performed at the positions D1, D2, D3, and D4, the first green pixels may be generated at the positions $P_{22}$, $P_{26}$, $P_{62}$, and $P_{66}$ as shown in FIG. 11, respectively.

The image signal processor 1 may generate binned G' pixels according to Formula 2 on the first green pixel. The image signal processor may add the high-frequency component, to which the weight is applied, to the first green pixel to generate binned G' pixel, as shown in FIG. 12. According to some embodiments, the image signal processor 1 may generate binned G' pixels from the first green pixel according to Formula 2.

Figure 13:
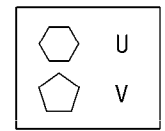

The image signal processor 1 may generate a U pixel value and a V pixel value, respectively, on the basis of the G' pixel, and the R pixel and the B pixel of the raw image, as shown in FIG. 13.

Specifically, as in Formula 5, the V pixel may be generated, by subtracting the average value $Gr_{Aver}$ of the Gr pixels placed on the same horizontal lines (e.g., rows) as the R pixels from the average value $R_{Aver}$ of all the R pixels included in the kernel X, then multiplying by the horizontal cost Hcost, subtracting the average value $Gb_{Aver}$ of Gb pixels placed on the same vertical lines (e.g., columns) as the R pixel, and then multiplying by the vertical cost Vcost and adding.

Referring to the Formula 9, the U pixel may be calculated, by subtracting the average value $Gb_{Aver}$ of Gb pixels placed at the same horizontal lines (e.g., rows) as B pixels from the average value $R_{Aver}$ of all the B pixels included in the kernel X, then multiplying by the horizontal cost Hcost, subtracting the average value $Gr_{Aver}$ of Gr pixels placed on the same vertical lines (e.g., columns) as B pixels, and then multiplying by the vertical cost Vcost and adding.

Figure 14:
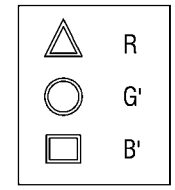

Referring to FIG. 14, the image signal processor 1 may merge the U pixel value and the V pixel value with the G' pixel to generate R' pixels and B' pixels, respectively. The image signal processor 1 may perform the inverse white balancing on the merged image to output a binned R'G'B' pixel image.

In the output binning image of FIG. 14, a difference in interval between the binning pixels may occur, depending on the downscaling ratio at the same kernel size, as compared to the binning image of FIG. 9.

Figure 15:
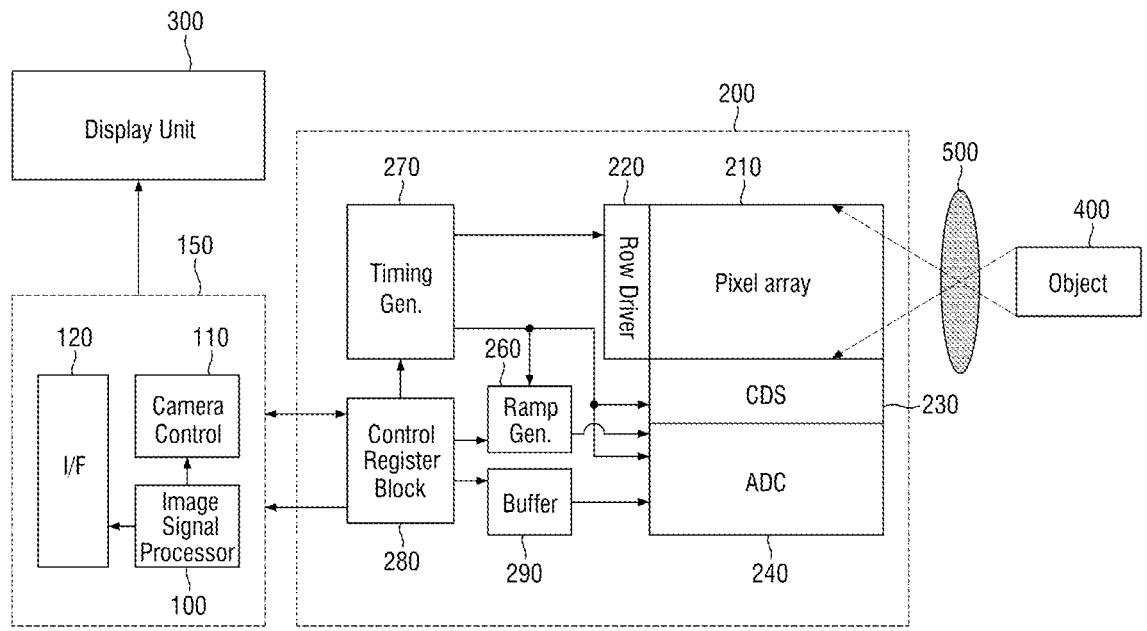
FIG. 15 is a diagram showing an image sensing device according to some embodiments of the present invention.

FIG. 15 is a diagram showing an image sensing device according to some embodiments of the present invention.

Referring to FIG. 15, according to some embodiments, the image signal processor of FIG. 1 may be included in the image sensing device. The image sensor 200 includes a pixel array 210, a row driver 220, a correlated double sampling (CDS) block 230, an analog digital converter (ADC) 240, a ramp generator 260, a timing generator 270, a control register block 280, and a buffer 290.

The image sensor 200 detects or senses an object 400 photographed through a lens 500 under the control of the digital signal processor (DSP) 150, and the DSP 150 may output an image sensed and output by the image sensor 200 to the display unit 300. At this time, the display unit 300 includes all devices capable of outputting or displaying the image. For example, the display unit 300 may refer to a computer, a mobile communication device, and/or other video output terminals.

The DSP 150 includes a camera control 110, an image signal processor (ISP) 100, and an interface (I/F) 120.

The camera control 110 controls the operation of the control register block 280. Although the camera control 110 may control the operation of the image sensor 200, that is, the control register block 280, using an I2C (inter-integrated circuit), embodiments of the present invention are not limited thereto.

An ISP 100 may include an ISP 1 as shown in FIG. 1 according to some embodiments. The ISP 100 receives the image data that is output from the buffer 290, processes or handles the received image data, and outputs the processed or handled image data to the display unit 300 through the I/F 120.

Although the ISP 100 is shown as being included in the DSP 150 in FIG. 15, the ISP 100 may additionally or alternatively be included in the image sensor 200 in some embodiments. Further, the image sensor 200 and the ISP 100 may be implemented as a single package, for example, as an MCP (multi-chip package).

The pixel array 210 may be implemented as a plurality of optical sensing elements, for example, a photo diode or a pinned photo diode. Raw image data that is output from the pixel array 210 through the CDS block 230 and the ADC 240 may be Bayer image data formed in a Bayer format.

The Bayer image data is processed into RGB format data (red, green, and blue format data) by the ISP 100 and is output to the display unit 300.

Figure 16:
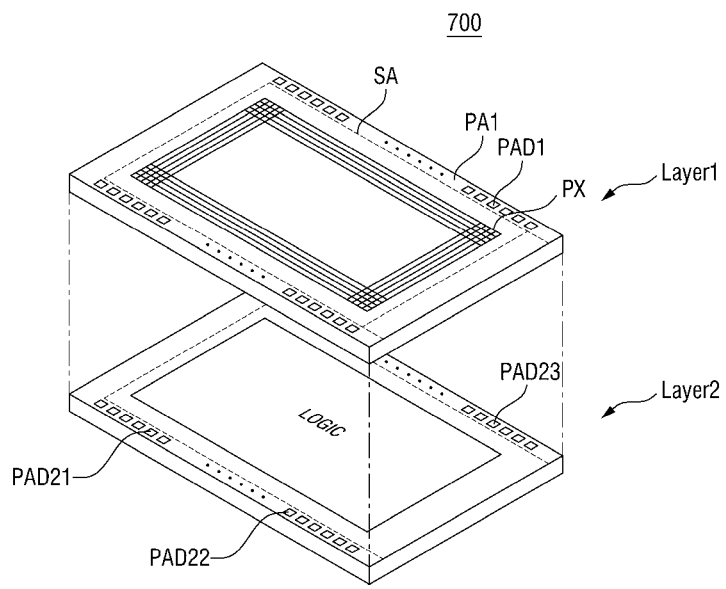
FIG. 16 is a diagram showing the image sensing device shown in FIG. 15.

FIG. 16 is a diagram showing the image sensing device shown in FIG. 15.

Referring to FIG. 16, the image sensor 700 may be implemented as a plurality of stacked layers. According to some embodiments, the pixel array 210 is implemented in a first layer (Layer 1), and the remaining configuration, that is, the logic circuit may be implemented in a second layer (Layer 2). The logic circuit may include the remaining components 220 to 290 other than the pixel array 210 in the image sensor 200 shown in FIG. 15. That is, the pixel array region and the logic circuit region may be stacked at a wafer level.

The first layer (Layer 1) may include a sensing area SA including a plurality of pixels PX, and a first pad area PA1 provided around the sensing area SA. The first pad area PA1 includes a plurality of upper pads PAD1, and the plurality of upper pads PAD1 may be connected to pads PAD21 and PAD22 and a logic circuit LOGIC provided in the second pad area PA2 of the second layer Layer 2, e.g., by conductive vias or the like.

According to some embodiments, the pads PAD21 and PAD22 may be input interface pads, and the pad PAD23 may be an output interface pad.

Figure 17:
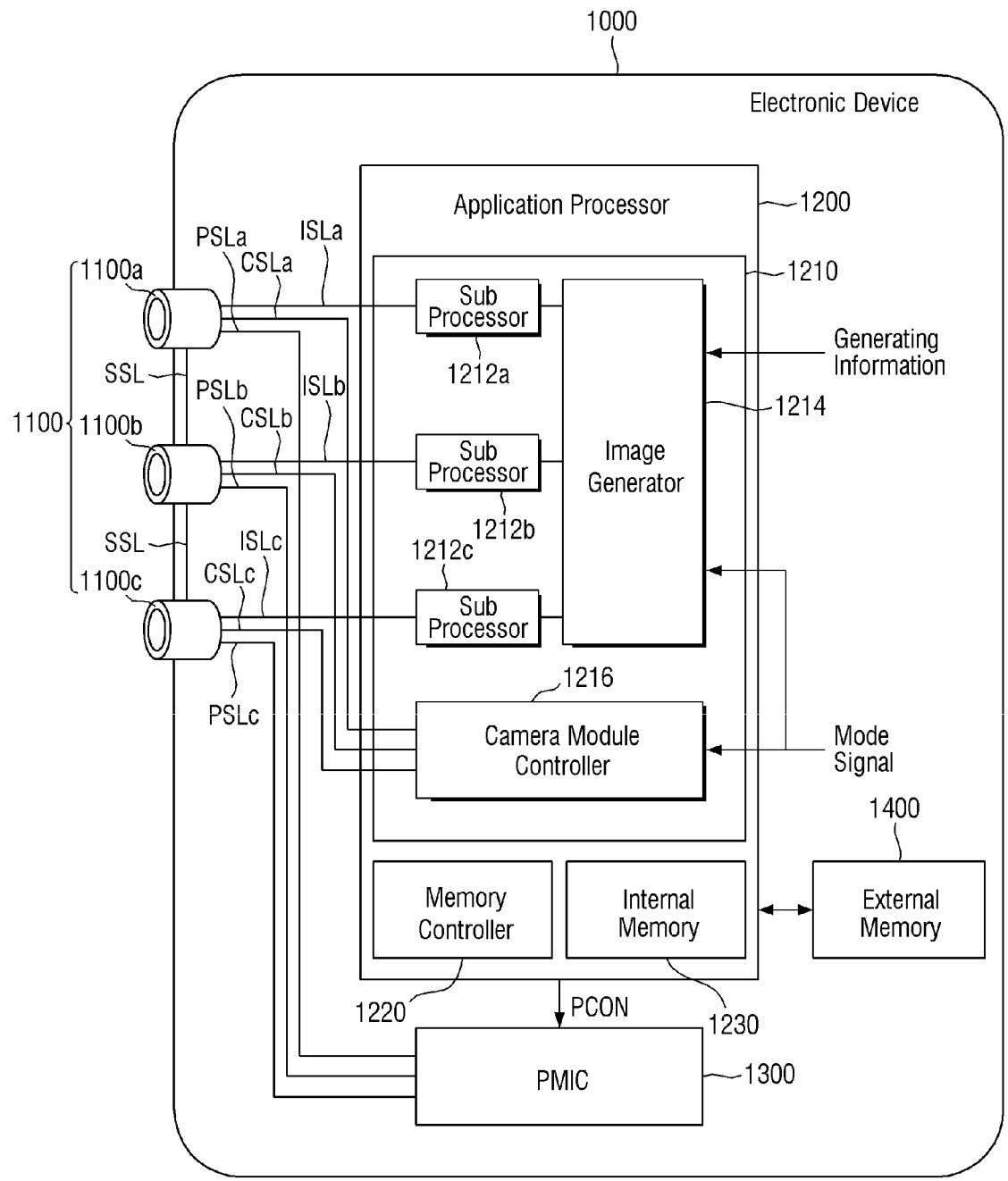
FIG. 17 is a block diagram of an electronic device including a multi-camera module according to some embodiments.
Figure 18:
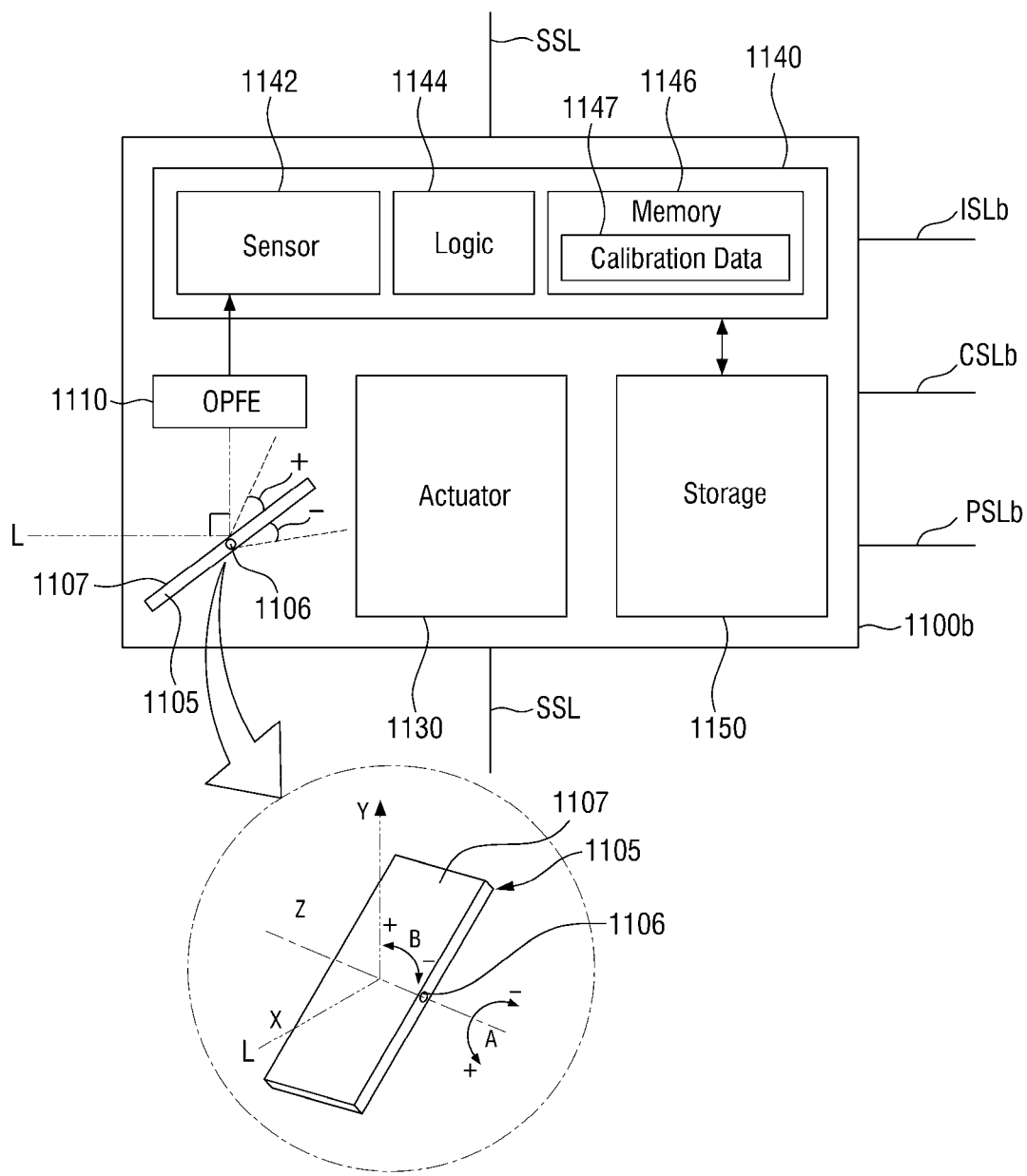
FIG. 18 is a detailed block diagram of the camera module of FIG. 17.

FIG. 17 is a block diagram of an electronic device including a multi-camera module according to some embodiments. FIG. 18 is a detailed block diagram of the camera module of FIG. 17.

Referring to FIG. 17, an electronic device 1000 may include a camera module group 1100, an application processor 1200, a PMIC 1300, and an external memory 1400.

The camera module group 1100 may include a plurality of camera modules 1100a, 1100b and 1100c. Although the drawings show an embodiment in which three camera modules 1100a, 1100b and 1100c are placed, the embodiments are not limited thereto, and fewer or more camera modules may be present. In some embodiments, the camera module group 1100 may be implemented by being modified to include only two camera modules. Also, in some embodiments, the camera module group 1100 may be modified to include n (n is a natural number equal to or greater than 4) camera modules.

Hereinafter, a detailed configuration of the camera module 1100b will be explained more specifically with reference to FIG. 18, but the following description may also be applied similarly to other camera modules 1100a and 1100c according to the embodiments.

Referring to FIG. 18, the camera module 1100b includes a prism 1105, an optical path folding element (hereinafter "OPFE") 1110, an actuator 1130, and an image sensing device 1140, and a storage 1150.

The prism 1105 may include a reflective surface 1107 of a light reflecting material to deform the path of the light L incident from outside the camera module 1100b, referred to herein as incident light L.

In some embodiments, the prism 1105 may change or redirect the path of the incident light L, which is incident in the first direction X, into a second direction Y, e.g., perpendicular to the first direction X. Also, the prism 1105 may rotate the reflective surface 1107 of the light reflecting material in a direction A around a central axis 1106, and/or may rotate the central axis 1106 in a direction B to change or redirect the path of the light L, which is incident in the first direction X, in the vertical second direction Y. At this time, the OPFE 1110 may also move in a third direction Z, e.g., perpendicular to the first direction X and the second direction Y.

In some embodiments, as shown, although a maximum rotation angle of the prism 1105 in the A direction may be 15 degrees or less in a positive (+) A direction, and may be greater than 15 degrees in a negative (−) A direction, the embodiments are not limited thereto.

In some embodiments, the prism 1105 may move about 20 degrees or between 10 and 20 degrees, or between 15 and 20 degrees in the positive (+) or negative (−) B direction. Here, a moving angle may move at the same angle in the positive (+) or negative (−) B direction, or may move at an almost similar angle within a range of about 1 degree.

In some embodiments, the prism 1105 may move the reflective surface 1107 of the light reflecting material in a third direction (e.g., a direction Z) parallel to an extension direction of the central axis 1106.

The OPFE 1110 may include, for example, optical lenses including m (here, m is a natural number) groups. The m lenses may move in the second direction Y to change an optical zoom ratio of the camera module 1100b. For example, when the basic optical zoom ratio of the camera module 1100b is defined as z, if them optical lenses included in the OPFE 1110 are moved, the optical zoom ratio of the camera module 1100b may be changed to an optical zoom ratio of 3z or 5z, or more.

The actuator 1130 may move the OPFE 1110 or an optical lens (collectively referred to as an optical lens) to a specific position. For example, the actuator 1130 may adjust the position of the optical lens so that the image sensor 1142 is located at the focal length of the optical lens for accurate sensing.

The image sensing device 1140 may include an image sensor 1142, control logic 1144 and a memory 1146. The image sensor 1142 may detect or sense the image of the sensing target, using the light L provided through the optical lens. The control logic 1144 may control the overall operation of the camera module 1100b. For example, the control logic 1144 may control the operation of the camera module 1100b according to the control signal provided through a control signal line CSLb.

The memory 1146 may store information used for the operation of the camera module 1100b, such as calibration data 1147. The calibration data 1147 may include information used by the camera module 1100b to generate image data, using the incident light L. The calibration data 1147 may include, for example, information about the degree of rotation, information about the focal length, information about the optical axis described above, and the like. When the camera module 1100b is implemented as a multi-state camera in which the focal length can be changed depending on the position of the optical lens, the calibration data 1147 may include a focal distance value for each position (or for each state) of the optical lens, and information about auto-focusing.

The storage 1150 may store the image data sensed through the image sensor 1142. The storage 1150 may be implemented outside the image sensing device 1140, and may be implemented in a form of being stacked with a sensor chip that constitutes the image sensing device 1140. In some embodiments, although the storage 1150 may be implemented as an EEPROM (Electrically Erasable Programmable Read-Only Memory), embodiments of the present invention are not limited thereto.

Referring to FIGS. 17 and 18, in some embodiments, each of the plurality of camera modules 1100a, 1100b, and 1100c may include an actuator 1130. Accordingly, each of the plurality of camera modules 1100a, 1100b, and 1100c may include the same or different calibration data 1147 according to the operation of the actuator 1130 included therein.

In some embodiments, one camera module (e.g., 1100b) of the plurality of camera modules 1100a, 1100b, and 1100c may be a folded lens type camera module including the prism 1105 and the OPFE 1110 explained above, and remaining camera modules (e.g., 1100a and 1100c) may be a vertical type camera module that does not include the prism 1105 and the OPFE 1110, but embodiments of the present invention are not limited thereto.

In some embodiments, one camera module (e.g., 1100c) of the plurality of camera modules 1100a, 1100b, and 1100c may be, for example, a vertical type depth camera which extracts depth information, using an IR (Infrared Ray) or otherwise using infrared light. In this case, the application processor 1200 may merge the image data provided from such a depth camera with the image data provided from another camera module (e.g., 1100a or 1100b) to generate a 3D depth image.

In some embodiments, at least two camera modules (e.g., 1100a, 1100b) of the plurality of camera modules 1100a, 1100b, and 1100c may have fields of view different from each other. In this case, for example, although the optical lenses of at least two camera modules (e.g., 1100a and 1100b) of the plurality of camera modules 1100a, 1100b, and 1100c may be different from each other, embodiments of the present invention are not limited thereto.

Also, in some embodiments, each of the plurality of camera modules 1100a, 1100b, and 1100c may have fields of view different from each other. In this case, although the optical lenses included in each of the plurality of camera modules 1100a, 1100b, and 1100c may also be different from each other, embodiments of the present invention are not limited thereto.

In some embodiments, each of the plurality of camera modules 1100a, 1100b, and 1100c may be placed to be physically separated from each other. That is, the plurality of camera modules 1100a, 1100b, and 1100c do not divide or share portions of the sensing area of one image sensor 1142, but rather an independent image sensor 1142 may be included each of the plurality of camera modules 1100a, 1100b, and 1100c.

Referring to FIG. 17 again, the application processor 1200 may include an image processing device 1210, a memory controller 1220, and an internal memory 1230. The application processor 1200 may be implemented separately from the plurality of camera modules 1100a, 1100b, and 1100c. For example, the application processor 1200 and the plurality of camera modules 1100a, 1100b, and 1100c may be implemented dividedly with or distributed in separate semiconductor chips.

The image processing device 1210 may include a plurality of sub-image processors 1212a, 1212b, and 1212c, an image generator 1214, and a camera module controller 1216.

The image processing device 1210 may include a plurality of sub-image processors 1212a, 1212b, and 1212c corresponding to the number of the plurality of camera modules 1100a, 1100b, and 1100c.

Image data generated from each of the camera modules 1100a, 1100b, and 1100c may be provided to the corresponding sub-image processors 1212a, 1212b, and 1212c through image signal lines ISLa, ISLb, and ISLc separated or distinct from each other. For example, the image data generated from the camera module 1100a may be provided to a sub-image processor 1212a through an image signal line ISLa, the image data generated from the camera module 1100b may be provided to a sub-image processor 1212b through an image signal line ISLb, and the image data generated from the camera module 1100c may be provided to a sub-image processor 1212c through an image signal line ISLc. Although such an image data transmission may be performed using, for example, a camera serial interface (CSI) based on a MIPI (Mobile Industry Processor Interface), the embodiments are not limited thereto.

Meanwhile, in some embodiments, one sub-image processor may be placed to correspond to a plurality of camera modules. For example, the sub-image processor 1212a and the sub-image processor 1212c may not be implemented separately from each other as shown, but rather may be implemented to be merged as a single sub-image processor, and the image data provided from the camera module 1100a and the camera module 1100c may be provided to the merged sub-image processor after being selected through a selection element (e.g., a multiplexer).

The image data provided to the respective sub-image processors 1212a, 1212b, and 1212c may be provided to the image generator 1214. The image generator 1214 may generate the output image, using the image data provided from each of the sub-image processors 1212a, 1212b, and 1212c according to the image generating information or the mode signal.

Specifically, the image generator 1214 may merge at least some of the image data generated from the camera modules 1100a, 1100b, and 1100c having different fields of view to generate an output image, according to the image generating information or the mode signal. Also, the image generator 1214 may select any one of the image data generated from the camera modules 1100a, 1100b, or 1100c having different fields of view to generate an output image, according to the image generating information or the mode signal.

In some embodiments, the image generating information may include a zoom signal (or zoom factor). Also, in some embodiments, the mode signal may be, for example, a signal based on a mode selected from a user.

When the image generating information is a zoom signal (zoom factor) and each of the camera modules 1100a, 1100b, and 1100c has respective fields of view (viewing angles) different from each other, the image generator 1214 may perform different operations from each other, depending on the type of zoom signal. For example, when the zoom signal is a first signal, after the image data output from the camera module 1100a and the image data output from the camera module 1100c are merged, an output image may be generated using the merged image signal, and the image data which is not used for merging may be output from the camera module 1100b. If the zoom signal is a second signal different from the first signal, the image generator 1214 may not merge the image data, and may select any one of the image data output from the camera modules 1100a, 1100b, or 1100c to generate the output image. However, embodiments of the present invention are not limited thereto, and a method for processing the image data may be modified and implemented as needed.

In some embodiments, the image generator 1214 receives image data of different exposure times from at least one of the plurality of sub-image processors 1212a, 1212b, and 1212c, and performs a HDR (high dynamic range) processing on the plurality of image data, thereby generating the merged image data with an increased dynamic range.

The image signal processor 1 shown in FIG. 1 may be used in various applications according to various embodiments. According to some embodiments, the image signal processor 1 may be implemented in logic 1144 in the camera module 1100b of FIG. 18, or the image signal processor 1 may be implemented in the sub-image processors 1212a, 1212b, 1212c of FIG. 17, or the image signal processor 1 may be implemented in the image generator 1214.

The camera module controller 1216 may provide a control signal to each of the camera modules 1100a, 1100b, and 1100c. The control signal generated from the camera module controller 1216 may be provided to the corresponding camera modules 1100a, 1100b, and 1100c through the control signal lines CSLa, CSLb, and CSLc separated from each other.

Any one of the plurality of camera modules 1100a, 1100b, and 1100c may be designated as a master camera (e.g., 1100b) according to the image generating information including a zoom signal, or a mode signal, and the remaining camera modules (e.g., 1100a and 1100c) may be designated as slave cameras. Such information is included in the control signal, and may be provided to the corresponding camera modules 1100a, 1100b, and 1100c through the control signal lines CSLa, CSLb, and CSLc separated or distinct from each other.

The camera modules operating as the master and slave may be changed or varied depending on the zoom factor or the operation mode signal. For example, when the viewing angle of the camera module 1100a is wider than that of the camera module 1100b, and the zoom factor shows a low zoom ratio, the camera module 1100b may operate as a master, and the camera module 1100a may operate as a slave. Conversely, when the zoom factor shows a high zoom ratio, the camera module 1100a may operate as a master and the camera module 1100b may operate as a slave.

In some embodiments, the control signals provided from the camera module controller 1216 to the respective camera modules 1100a, 1100b, and 1100c may include sync enable signals. For example, when the camera module 1100b is a master camera and the camera modules 1100a and 1100c are slave cameras, the camera module controller 1216 may transmit the sync enable signal to the camera module 1100b. The camera module 1100b provided with such a sync enable signal generates a sync signal on the basis of the provided sync enable signal, and may provide the generated sync signal to the camera modules 1100a and 1100c through the sync signal line SSL. The camera module 1100b and the camera modules 1100a and 1100c may transmit the image data to the application processor 1200 in synchronization with such a sync signal.

In some embodiments, the control signal provided from the camera module controller 1216 to the plurality of camera modules 1100a, 1100b, and 1100c may include mode information according to the mode signal. On the basis of the mode information, the plurality of camera modules 1100a, 1100b, and 1100c may operate in the first operation mode or the second operation mode in relation to the sensing speed.

The plurality of camera modules 1100a, 1100b, and/or 1100c generates an image signal at a first speed (for example, generates an image signal of a first frame rate) in the first operation mode, encodes the image signal at a second speed higher than the first speed (e.g., encodes an image signal of a second frame rate higher than the first frame rate), and may transmit the encoded image signal to the application processor 1200. At this time, the second speed may be equal to or less than 30 times the first speed.

The application processor 1200 stores the received image signal, that is to say, the encoded image signal, in the memory 1230 provided inside or the storage 1400 outside the application processor 1200. Thereafter, the application processor 1200 may read and decode the encoded image signal from the memory 1230 or the external memory storage 1400, and may display the image data generated on the basis of the decoded image signal. For example, the corresponding sub-processors among the plurality of sub-processors 1212a, 1212b, and 1212c of the image processing device 1210 may perform decoding, and may perform the image processing on the decoded image signal.

In the second operation mode, the plurality of camera modules 1100a, 1100b, and/or 1100c generates an image signal at a third speed lower than the first speed (for example, generates an image signal of a third frame rate lower than the first frame rate), and may transmit the image signal to the application processor 1200. The image signal provided to the application processor 1200 may be a non-encoded signal. The application processor 1200 may perform the image processing on the received image signal or store the image signal in the memory 1230 or the external memory storage 1400.

The PMIC 1300 may supply a power, for example, a power supply voltage, to each of the plurality of camera modules 1100a, 1100b, and 1100c. For example, under the control of the application processor 1200, the PMIC 1300 may supply a first power level to the camera module 1100a through a power signal line PSLa, supply a second power level to the camera module 1100b through a power signal line PSLb, and supply a third power level to the camera module 1100c through a power signal line PSLc.

The PMIC 1300 is responsive to a power control signal PCON from the application processor 1200 to generate power corresponding to each of the plurality of camera modules 1100a, 1100b, and 1100c, and may adjust the level of the power. The power control signal PCON may include a power adjustment signal for each operation mode of the plurality of camera modules 1100a, 1100b, and 1100c. For example, the operation mode may include a low power mode, and at this time, the power control signal PCON may include information on the camera module operating in the low power mode and the power level to be set. The power levels supplied to each of the plurality of camera modules 1100a, 1100b, and 1100c may be the same as or different from each other. Also, the power level may be changed dynamically.

In concluding the detailed description, those skilled in the art will appreciate that many variations and modifications may be made to the preferred embodiments without substantially departing from the principles of the present invention. Therefore, the disclosed preferred embodiments of the invention are used in a generic and descriptive sense only and not for purposes of limitation.

What is claimed is:

1. An image signal processor comprising:
a white balancing circuit configured to perform white balancing on a raw RGB image of a Bayer pattern received from an image sensor to generate a white-balanced G pixel, a white-balanced R pixel, and a white-balanced B pixel;
a green generation circuit configured to perform cross-binning on the white-balanced G pixel to generate a first green pixel, and to add a high-frequency component to which a preset weight is applied to the first green pixel to generate a binned green pixel;
a red-blue generation circuit configured to generate a U pixel and a V pixel indicating directionality based on the binned green pixel, the white-balanced R pixel, and the white-balanced B pixel, and to merge the binned green pixel with each of the U pixel and the V pixel to generate a binned red pixel and a binned blue pixel, respectively; and
an inverse white balancing circuit configured to perform an inverse white balancing on the binned red pixel, the binned green pixel, and the binned blue pixel to output a final binning image.

2. The image signal processor of claim 1, wherein the white-balanced G pixel comprises respective white-balanced G pixels, and the cross-binning generates the first green pixel based on the respective white-balanced G pixels positioned vertically and horizontally relative to a target position for the binned green pixel.

3. The image signal processor of claim 2, wherein the cross-binning generates the first green pixel having uniform sampling points based on a center position of a kernel unit.

4. The image signal processor of claim 3, wherein:
the kernel unit comprises a subset of pixels of the Bayer pattern of the raw RGB image;
the respective white-balanced G pixels comprise first pixels in a same row of the kernel unit as the target position, and second pixels in a same column of the kernel unit as the target position, one of the first and second pixels comprising Gb pixels, and the other of the first and second pixels comprising Gr pixels; and
the U and V pixels indicate directionality of the Gb and Gr pixels, respectively.

5. The image signal processor of claim 1, wherein the high-frequency component is obtained by subtracting an average B pixel value from the white-balanced B pixel, or by subtracting an average R pixel value from the white-balanced R pixel.

6. The image signal processor of claim 5, wherein the average B pixel value is an average value of a plurality of B pixels included in a kernel unit, and wherein the average R pixel value is an average value of a plurality of R pixels included in the kernel unit.

7. The image signal processor of claim 1, wherein the V pixel is obtained by adding a color difference value between an average R pixel value and an average Gr pixel value indicating a first cost, and a color difference value between the average R pixel value and an average Gb pixel value indicating a second cost.

8. The image signal processor of claim 7, wherein the first cost is a reciprocal of a value obtained by summing differences in luminance between horizontally adjacent same color pixels in a kernel unit, and
the second cost is a reciprocal of a value obtained by summing differences in luminance between vertically adjacent same color pixels in the kernel unit.

9. The image signal processor of claim 1, wherein the U pixel comprises a value obtained by adding a color difference value between an average B pixel value and an average Gb pixel value indicating a first cost, and a color difference value between the average B pixel value and an average Gr pixel value indicating a second cost.

10. The image signal processor of claim 1, wherein the red-blue generation circuit is configured to add the binned green pixel to the V pixel to generate the binned red pixel, and to add the binned green pixel to the U pixel to generate the binned blue pixel.

11. An electronic device comprising:
an image sensor configured to detect light reflected from a subject and to output a raw RGB image of a Bayer pattern; and
an image signal processor configured to perform binning from the raw RGB image to generate a binned image,
wherein the image signal processor is configured to perform operations comprising:
performing white balancing on the raw RGB image to generate a white-balanced G pixel, a white-balanced R pixel, and a white-balanced B pixel;
performing a green pre-processing operation on the white-balanced G pixel, and adding a high-frequency component to generate a binned green pixel;
generating U and V pixels indicating directionality based on the binned green pixel, the white-balanced R pixel, and the white-balanced B pixel;
merging the binned green pixel with each of the U pixel and the V pixel to generate a binned red pixel and a binned blue pixel, respectively; and
performing an inverse white balancing on the binned red pixel, the binned green pixel, and the binned blue pixel to output the binned image.

12. The electronic device of claim 11, wherein the electronic device comprises at least one camera module, and wherein the camera module includes the image sensor and the image signal processor.

13. The electronic device of claim 11, wherein the image sensor comprises a plurality of image sensors, wherein the image signal processor comprises a plurality of image signal processors, and wherein the electronic device further comprises:
a plurality of camera modules that are physically separated, wherein each of the plurality of camera modules includes a respective image sensor of the plurality of image sensors and is configured to output the raw RGB image; and
an application processor including an image processing device, a memory controller, and an internal memory, wherein the image processing device includes a plurality of sub-image processors corresponding to the plurality of camera modules, respectively, and
wherein each of the plurality of sub-image processors includes a respective image signal processor of the plurality of image signal processors.

14. The electronic device of claim 11, wherein the white-balanced G pixel comprises respective white-balanced G pixels, and the green pre-processing operation generates a first green pixel based on the respective white-balanced G pixels positioned adjacent to each other vertically and horizontally around a target position for the binned green pixel.

15. The electronic device of claim 14, wherein the high-frequency component is obtained by applying a preset weight to a value obtained by subtracting an average B pixel value from the white-balanced B pixel, or by subtracting an average R pixel value from the white-balanced R pixel.

16. The electronic device of claim 14, wherein:
a kernel comprises a subset of pixels of the Bayer pattern of the raw RGB image;
the respective white-balanced G pixels comprise first pixels in a same row of the kernel as the target position, and second pixels in a same column of the kernel as the target position, one of the first and second pixels comprising Gb pixels, and the other of the first and second pixels comprising Gr pixels; and
the U and V pixels indicate directionality of the Gb and Gr pixels, respectively.

17. The electronic device of claim 11, wherein:
the U pixel is obtained by adding a color difference value of an average B pixel value and an average Gb pixel value indicating a first cost, and a color difference value of the average B pixel value and an average Gr pixel value indicating a second cost, and
the V pixel is obtained by adding a color difference value of an average R pixel value and the average Gr pixel value indicating the first cost, and a color difference value of the average R pixel value and the average Gb pixel value indicating the second cost.

18. The electronic device of claim 17, wherein the first cost is a reciprocal value of summing differences in luminance between horizontally adjacent same color pixels in a kernel, and
the second cost is a reciprocal value of summing up differences in luminance between vertically adjacent same color pixels in the kernel.

19. The electronic device of claim 17, wherein:
the average Gb pixel value is an average value of white-balanced Gb pixels positioned in same rows as respective B pixels in a kernel, and
the average Gr pixel value is an average value of white-balanced Gr pixels positioned in same rows as respective R pixels in the kernel.

20. An image signal processing method comprising:
receiving a raw RGB image of a Bayer pattern;
performing white balancing on the raw RGB image on a kernel basis to generate a white balanced G pixel, a white-balanced R pixel, and a white-balanced B pixel;
performing cross-binning on the white-balanced G pixel to generate a first green pixel;

adding a high-frequency component to the first green pixel to generate a binned green pixel;

generating a U pixel and a V pixel indicating a vertical cost and a horizontal cost based on the binned green pixel, the white-balanced R pixel, and the white-balanced B pixel;

merging the binned green pixel with each of the U pixel and the V pixel to generate a binned image of a Bayer pattern including a binned red pixel and a binned blue pixel; and performing inverse white balancing on the binned image to output a final binning image.

\* \* \* \* \*